(12) United States Patent
Chmiel et al.

(10) Patent No.: US 10,484,887 B2
(45) Date of Patent: Nov. 19, 2019

(54) MONITORING AND OPTIMIZING OF CONTROL CHANNEL USAGE

(71) Applicant: Nokia Solutions and Networks Oy, Espoo (FI)

(72) Inventors: Mieszko Chmiel, Wroclaw (PL); Martin Kollar, Kosice (SK); Yizhi Yao, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 60 days.

(21) Appl. No.: 15/326,617

(22) PCT Filed: Jul. 18, 2014

(86) PCT No.: PCT/CN2014/082527
§ 371 (c)(1),
(2) Date: Jan. 16, 2017

(87) PCT Pub. No.: WO2016/008160
PCT Pub. Date: Jan. 21, 2016

(65) Prior Publication Data
US 2017/0208483 A1    Jul. 20, 2017

(51) Int. Cl.
*H04W 4/00* (2018.01)
*H04W 24/02* (2009.01)
*H04W 72/04* (2009.01)

(52) U.S. Cl.
CPC ....... *H04W 24/02* (2013.01); *H04W 72/0413* (2013.01); *H04W 72/0446* (2013.01)

(58) Field of Classification Search
USPC ....... 370/229, 230, 235, 236, 252, 328, 329, 370/339, 343
See application file for complete search history.

(56) References Cited

U.S. PATENT DOCUMENTS

| | | | |
|---|---|---|---|
| 9,247,534 B2* | 1/2016 | Han | H04W 72/0413 |
| 2011/0064115 A1* | 3/2011 | Xu | H04L 1/0618 375/130 |
| 2011/0087918 A1 | 4/2011 | Mehta et al. | 714/4.12 |

(Continued)

FOREIGN PATENT DOCUMENTS

| | | |
|---|---|---|
| CN | 1983993 A | 6/2007 |
| CN | 102638879 A | 8/2012 |

(Continued)

OTHER PUBLICATIONS

"3rd Generation Partnership Project; Technical Specification Group Radio Access Network; Evolved Universal Terrestrial Radio Access (E-UTRA); Physical channels and modulation(Release 12)", 3GPP TS 36.211, V12.1.0, Mar. 2014, pp. 1-120.

(Continued)

*Primary Examiner* — Kwang B Yao
*Assistant Examiner* — Nguyen H Ngo
(74) *Attorney, Agent, or Firm* — Harrington & Smith

(57) ABSTRACT

A method comprising monitoring whether or not an allocation of uplink communication resources on a primary cell of a communication network is successful for a communication element to be scheduled on a downlink channel of at least one secondary cell of the communication network, and incrementing at least one counter according to the monitoring result.

19 Claims, 7 Drawing Sheets

(56) References Cited

U.S. PATENT DOCUMENTS

| | | | |
|---|---|---|---|
| 2011/0134774 A1* | 6/2011 | Pelletier | H04W 52/365 370/252 |
| 2012/0069805 A1* | 3/2012 | Feuersanger | H04W 72/1284 370/329 |
| 2012/0230238 A1 | 9/2012 | Dalsgaard et al. | |
| 2013/0242815 A1 | 9/2013 | Wang et al. | |
| 2013/0250901 A1* | 9/2013 | Oizumi | H04W 76/28 370/329 |
| 2013/0336201 A1* | 12/2013 | Nishio | H04W 16/26 370/315 |
| 2014/0198746 A1 | 7/2014 | Ahn et al. | |
| 2014/0204897 A1* | 7/2014 | Takeda | H04W 72/042 370/329 |
| 2014/0269600 A1* | 9/2014 | Lee | H04L 5/0007 370/329 |
| 2015/0023145 A1* | 1/2015 | Kim | H04L 5/1469 370/201 |
| 2015/0163794 A1* | 6/2015 | Liang | H04W 72/042 370/329 |
| 2016/0192350 A1* | 6/2016 | Yi | H04W 52/146 370/329 |
| 2018/0175975 A1* | 6/2018 | Um | H04L 1/1816 |
| 2018/0191460 A1* | 7/2018 | Chen | H04L 5/0057 |

FOREIGN PATENT DOCUMENTS

| | | |
|---|---|---|
| CN | 102870450 A | 1/2013 |
| CN | 103733558 A | 4/2014 |
| EP | 2415195 A1 | 2/2012 |
| WO | 2010/112085 A1 | 10/2010 |

OTHER PUBLICATIONS

"3rd Generation Partnership Project; Technical Specification Group Radio Access Network; Evolved Universal Terrestrial Radio Access (E-UTRA); Multiplexing and channel coding(Release 12)", 3GPP TS 36.212, V12.0.0, Dec. 2013, pp. 1-88.

"3rd Generation Partnership Project; Technical Specification Group Radio Access Network; Evolved Universal Terrestrial Radio Access (E-UTRA); Physical layer procedures(Release 12)", 3GPP TS 36.213 V12.1.0, Mar. 2014, pp. 1-186.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 12)", 3GPP TS 36.300 V12.1.0, Mar. 2014, pp. 1-209.

"3rd Generation Partnership Project; Technical Specification Group Services and System Aspects; Telecommunication management; Performance Management (PM); Performance measurements Evolved Universal Terrestrial Radio Access Network (E-UTRAN) (Release 12)", 3GPP TS 32.425, V12.0.0, Jun. 2013, pp. 1-74.

"3rd Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Information Service (IS)(Release 11)", 3GPP TS 28.658, V11.3.0, Dec. 2013, pp. 1-49.

"Add Measurements on PUCCH Usage in CA", 3GPP TSG-SA5 Meeting #97, S5-145372, Nokia Networks, Oct. 20-24, 2014, 3 pages.

"Text Proposal for Generalised Hierarchical Golay Sequence for Psc With Low Complexity Correlation Using Pruned Efficient Golay Correlators", TSG-RAN Working Group 1 meeting No. 5, TSGR1-568/99, Agenda Item: Adhoc 12, Siemens, Jun. 1-4, pp. 1-2.

"3rd Generation Partnership Project; Technical Specification Group Radio Access Network; RRC Protocol Specification(Release 1999)", 3GPP TS 25.331, V3.5.0, Dec. 2000, pp. 1-630.

International Search Report and Written Opinion received for corresponding Patent Cooperation Treaty Application No. PCT/CN2014/082527, dated Mar. 27, 2015, 11 pages.

Extended European Search Report received for corresponding European Patent Application No. 14897461.1 dated Feb. 23, 2018, 10 pages.

* cited by examiner

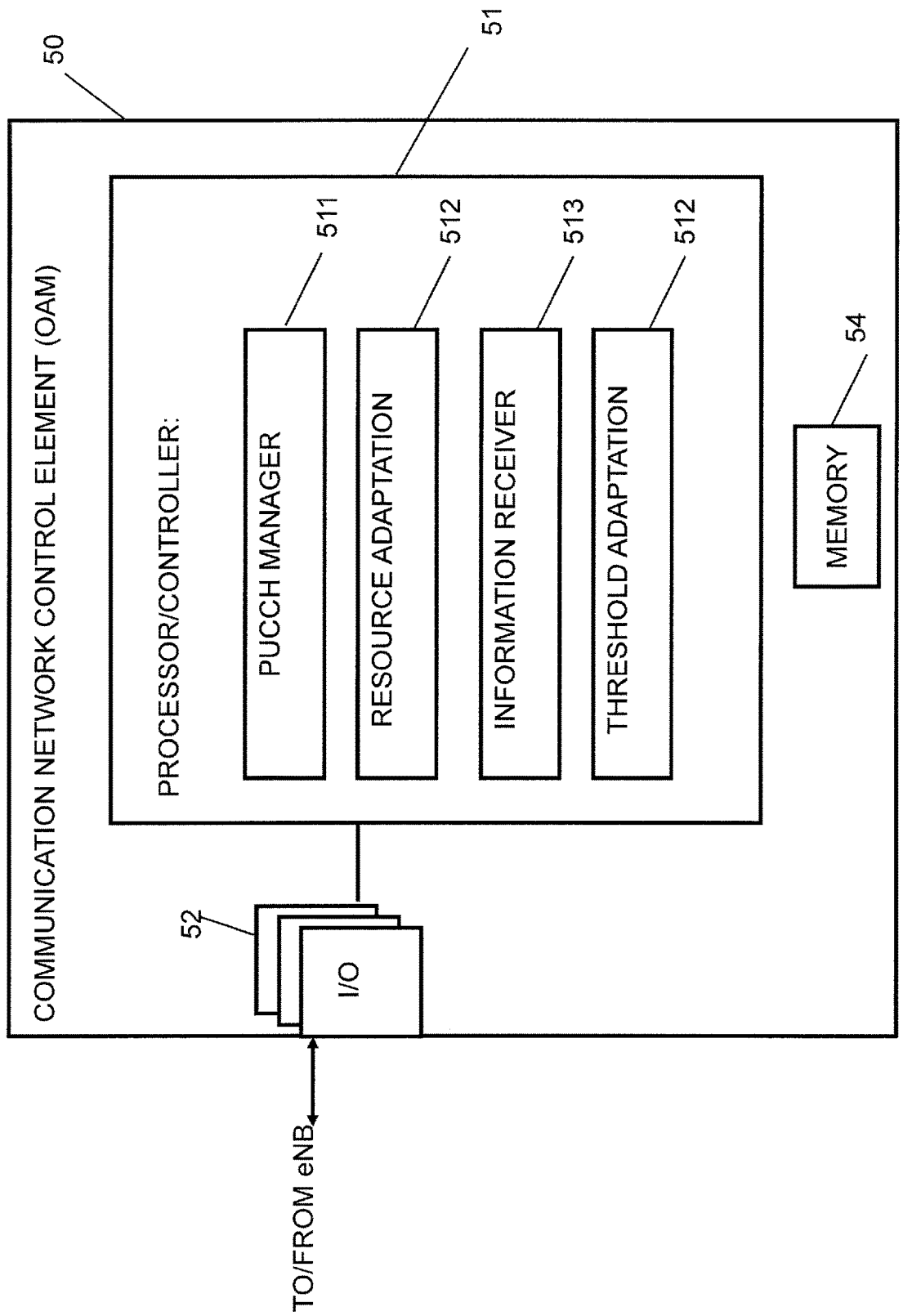

MONITORING AND OPTIMIZING OF CONTROL CHANNEL USAGE

RELATED APPLICATION

This application was originally filed as PCT Application No. PCT/CN2014/082527filed Jul. 18, 2014.

BACKGROUND

Field

The present invention relates to apparatuses, methods, systems, computer programs, computer program products and computer-readable media usable for monitoring and optimizing the usage of control channels in communication systems.

Background Art

The following description of background art may include insights, discoveries, understandings or disclosures, or associations, together with disclosures not known to the relevant prior art, to at least some examples of embodiments of the present invention but provided by the invention. Some of such contributions of the invention may be specifically pointed out below, whereas other of such contributions of the invention will be apparent from the related context.

The following meanings for the abbreviations used in this specification apply:
3GPP 3$^{rd}$ Generation Partner Project
ACK: acknowledgement
BS: base station
CA: carrier aggregation
CC: component carrier
CPU: central processing unit
DL: downlink
eNB: evolved node B
EPS: evolved packet system
FDD: frequency division duplex
Itf-N: interface N
LTE: Long Term Evolution
LTE-A: LTE Advanced
MAC: medium access control
NACK: non-acknowledgement
OAM: operation and maintenance
Pcell: primary cell
PDCCH: physical downlink control channel
PDSCH: physical downlink shared channel
PM: Performance Management
PRB: physical resource block
PUCCH: physical uplink control channel
PUSCH: physical uplink shared channel
RRC: radio resource control
RRH: remote radio head
Scell: secondary cell
SIB: system information block
TDD: time division duplex
TTI: transmission time interval
UE: user equipment
UL: uplink Embodiments of the present invention are related to a communication network in which carrier aggregation is implemented for communications of a communication element such as a UE.

SUMMARY

According to an example of an embodiment, there is provided, for example, a method comprising monitoring whether or not an allocation of uplink communication resources on a primary cell of a communication network is successful for a communication element to be scheduled on a downlink channel of at least one secondary cell of the communication network; and incrementing at least one counter according to the monitoring result.

Furthermore, according to an example of an embodiment, there is provided, for example, an apparatus comprising at least one processing circuitry, and at least one memory for storing instructions to be executed by the processing circuitry, wherein the at least one memory and the instructions are configured to, with the at least one processing circuitry, cause the apparatus at least: to monitor whether or not an allocation of uplink communication resources on a primary cell of a communication network is successful for a communication element to be scheduled on a downlink channel of at least one secondary cell of the communication network; and to increment at least one counter according to the monitoring result.

Moreover, according to another example of embodiments, there is provided an apparatus comprising means for monitoring whether or not an allocation of uplink communication resources on a primary cell of a communication network is successful for a communication element to be scheduled on a downlink channel of at least one secondary cell of the communication network; and means for incrementing at least one counter according to the monitoring result.

According to further refinements, these examples may comprise one or more of the following features:
- the at least one counter may comprise a counter configured to count a rate of blocking of a secondary cell scheduling for the communication element due to a lack of uplink communication resources on the primary cell, or a counter configured to count a rate of collision of uplink communication resources due to a secondary cell scheduling for the communication element, or a counter configured to a rate of both of blocking of a secondary cell scheduling for the communication element due to a lack of uplink communication resources on the primary cell and collision of uplink communication resources due to a secondary cell scheduling for the communication element.
- alternatively, the at least one counter may comprise a first counter configured to count a number of attempts for allocating uplink communication resources on the primary cell of the communication network for the communication element to be scheduled on the downlink channel of the at least one secondary cell of the communication network, and a second counter configured to count a number of at least one of successful allocations of uplink communication resources on the primary cell and failed allocations of uplink communication resources on the primary cell for the communication element to be scheduled on the downlink channel of the at least one secondary cell.
- a rate value for a successful or unsuccessful resource allocation may be derived based on values of the at least one counter;
- the at least one counter may comprise a counter configured to count an average rate or probability value for a successful or unsuccessful resource allocation based on values of the at least one counter;
- the average rate or probability value may be derived for a predetermined period of time, wherein the predetermined period of time may be adjustable between one transmission time interval and a plurality of transmission time intervals;

a standard deviation value related to the successful or unsuccessful resource allocation may be calculated based on values of the at least one counter;

a counter value, or a rate value, or an average rate or probability value may be related to communication elements to be scheduled in one secondary cell related to the primary cell or to communication elements of each secondary cell related to the primary cell;

a counter value, or a rate value, or an average rate or probability value may be compared with at least one predetermined threshold, and, on the basis of the comparison, it may be decided whether or not a dimensioning of resources being set for the uplink communication resources is to be modified;

a modification of resources being set for the uplink communication resources may be decided on the basis of the decision, wherein the modification may comprise one of increasing or decreasing the number of the resources being set for the uplink communication resources;

the at least one predetermined threshold may comprise a first threshold defining a high end threshold related to a requirement for increasing the number of the resources being set for the uplink communication resources, and a second threshold defining a low end threshold related to an option for decreasing the number of the resources being set for the uplink communication resources;

in the monitoring, the allocation of uplink communication resources on the primary cell of the communication network is assumed to be unsuccessful in case of one of a blocking of a secondary cell scheduling for the communication element due to a lack of uplink communication resources on the primary cell, and a collision of uplink communication resources due to a secondary cell scheduling for the communication element;

the at least one counter may comprise a separate counter for each channel format for which the uplink communication resources are used;

transmission of at least one of counter values resulting from incrementing the at least one counter, or rate values or average rate or probability values for a successful or unsuccessful resource allocation to a communication network control element comprising one of a third party tool and an operation and maintenance element may be caused;

information for setting at least one predetermined threshold to be used for a comparison with a counter value, a rate value, an average rate or probability value for a successful or unsuccessful resource allocation may be received;

the communication element may communicate with the communication network by using a carrier aggregation mode with the primary cell and the at least one secondary cell, and the uplink communication resources may be related to a physical uplink control channel of format 1b with channel selection or format 3 according to a Long Term Evolution or Long Term Evolution Advanced communication network specification;

the processing is implemented in one of a communication network control element of the communication network configured to control the primary cell of the communication network, and/or an operation and maintenance element of the communication network, wherein the communication element may be one of a communication terminal, a communication device, and a user equipment.

According to a further example of an embodiment, there is provided, for example, a method comprising acquiring a counter value, a rate value or an average rate or probability value for a successful or unsuccessful resource allocation on the basis of information related to a monitoring of whether or not an allocation of uplink communication resources on a primary cell of a communication network is successful for a communication element to be scheduled on a downlink channel of at least one secondary cell of the communication network; comparing the counter value, the rate value or the average rate or probability value with at least one predetermined threshold; and deciding, on the basis of the comparison, whether or not a dimensioning of resources being set for the uplink communication resources is to be modified.

Furthermore, according to an example of an embodiment, there is provided, for example, an apparatus comprising at least one processing circuitry, and at least one memory for storing instructions to be executed by the processing circuitry, wherein the at least one memory and the instructions are configured to, with the at least one processing circuitry, cause the apparatus at least: to acquire a counter value, a rate value or an average rate or probability value for a successful or unsuccessful resource allocation on the basis of information related to a monitoring of whether or not an allocation of uplink communication resources on a primary cell of a communication network is successful for a communication element to be scheduled on a downlink channel of at least one secondary cell of the communication network; to compare the counter value, the rate value or the average rate or probability value with at least one predetermined threshold; and to decide, on the basis of the comparison, whether or not a dimensioning of resources being set for the uplink communication resources is to be modified.

Furthermore, according to another example of embodiments, there is provided an apparatus comprising means for acquiring a counter value, a rate value or an average rate or probability value for a successful or unsuccessful resource allocation on the basis of information related to a monitoring of whether or not an allocation of uplink communication resources on a primary cell of a communication network is successful for a communication element to be scheduled on a downlink channel of at least one secondary cell of the communication network; means for comparing the counter value, the rate value or the average rate or probability value with at least one predetermined threshold; and means for deciding, on the basis of the comparison, whether or not a dimensioning of resources being set for the uplink communication resources is to be modified.

According to further refinements, these examples may comprise one or more of the following features:

the acquiring of the counter value, the rate value or the average rate or probability value for a successful or unsuccessful resource allocation may comprise one of receiving the counter value, the rate value or the average rate or probability value from a monitoring element being part of a communication network control element of the communication network, and receiving and processing counter values of at least one counter of the monitoring element and deriving the rate value on the basis of the received values of the at least one counter;

a standard deviation value related to the successful or unsuccessful resource allocation may be calculated based on values of the at least one counter;

the at least one counter may comprise a counter configured to count a rate of blocking of a secondary cell scheduling for the communication element due to a lack of uplink communication resources on the primary cell, or a counter configured to count a rate of collision of uplink communication resources due to a secondary cell scheduling for the communication element, or a counter configured to count rates of both of blocking of a secondary cell scheduling for the communication element due to a lack of uplink communication resources on the primary cell and collision of uplink communication resources due to a secondary cell scheduling for the communication element;

alternatively, the at least one counter may comprise a first counter configured to count a number of attempts for allocating uplink communication resources on the primary cell of the communication network for the communication element to be scheduled on the downlink channel of the at least one secondary cell of the communication network, and a second counter configured to count a number of at least one of successful allocations of uplink communication resources on the primary cell and failed allocations of uplink communication resources on the primary cell for the communication element to be scheduled on the downlink channel of the at least one secondary cell;

the at least one counter may comprise a separate counter for each channel format for which the uplink communication resources are used;

the average rate or probability value may be derived for a predetermined period of time, wherein the predetermined period of time is adjustable between one transmission time interval and a plurality of transmission time intervals;

the counter value, the rate value or the average rate or probability value may be related to communication elements to be scheduled in one secondary cell related to the primary cell or to communication elements of each secondary cell related to the primary cell;

a modification of resources being set for the uplink communication resources may be caused on the basis of the decision, wherein the modification may comprise one of increasing or decreasing the number of the resources being set for the uplink communication resources;

the at least one predetermined threshold may comprise a first threshold defining a high end threshold related to a requirement for increasing the number of the resources being set for the uplink communication resources, and a second threshold defining a low end threshold related to an option for decreasing the number of the resources being set for the uplink communication resources;

the allocation of uplink communication resources on the primary cell of the communication network is assumed to be unsuccessful in case of one of a blocking of a secondary cell scheduling for the communication element due to a lack of uplink communication resources on the primary cell, and a collision of uplink communication resources due to a secondary cell scheduling for the communication element.

the communication element may communicate with the communication network by using a carrier aggregation mode with the primary cell and the at least one secondary cell, and the uplink communication resources may be related to a physical uplink control channel of format 1b with channel selection or format 3 according to a Long Term Evolution or Long Term Evolution Advanced communication network specification;

the at least one predetermined threshold value to be used for a comparison with the counter value, the rate value or the average rate or probability value may be modified, and causing transmission of the modified at least one predetermined threshold value to a monitoring element being part of a communication network control element of the communication network may be caused;

the processing may be implemented in an operation and maintenance element of the communication network.

In addition, according to embodiments, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present invention are described below, by way of example only, with reference to the accompanying drawings, in which:

FIG. 7 shows a diagram of an OAM element according to some examples of embodiments.

DESCRIPTION OF EMBODIMENTS

Figure 1:
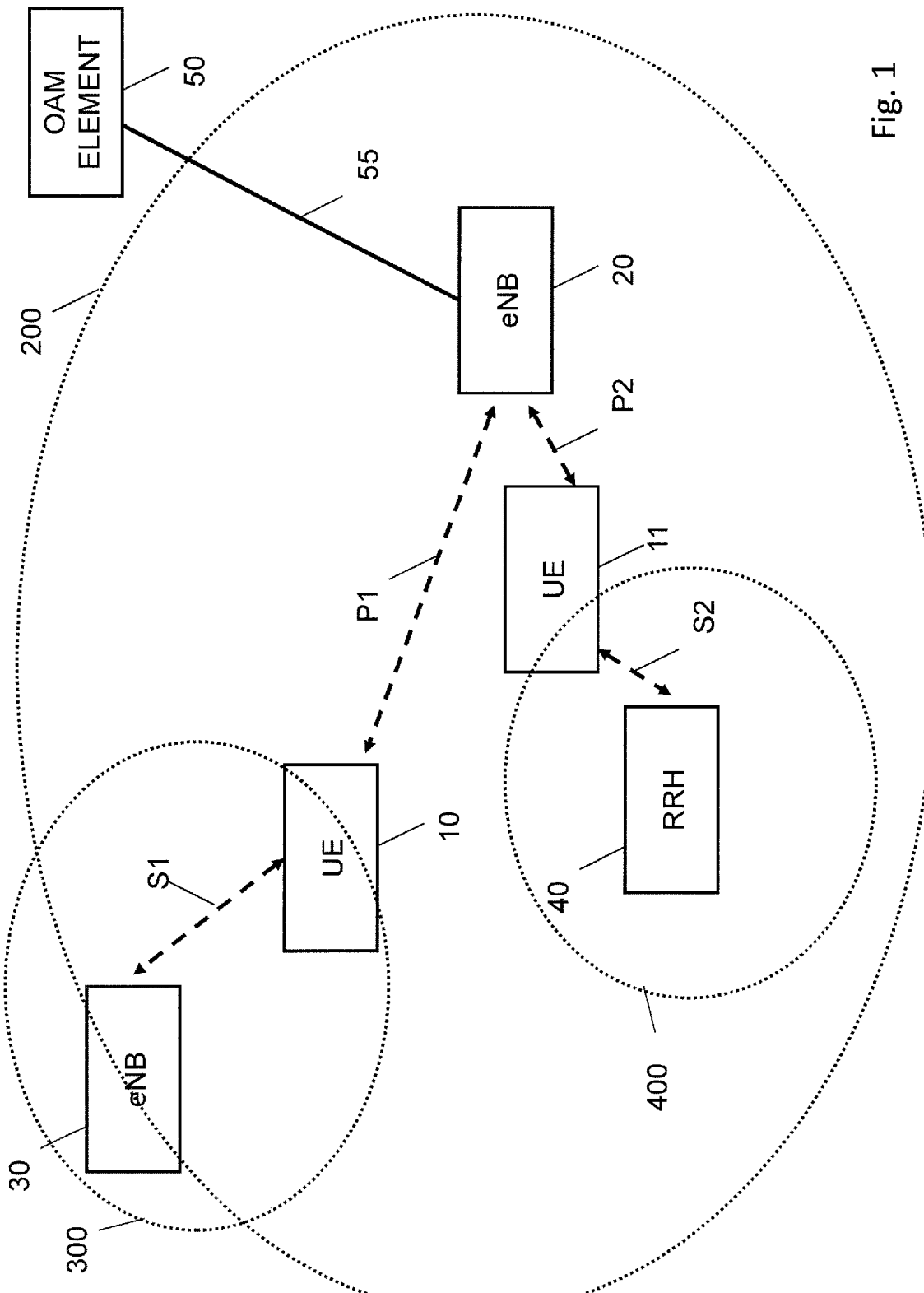
FIG. 1 shows a diagram illustrating a general configuration of a communication network where some examples of embodiments are implementable.

In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) like the Universal Mobile Telecommunications System (UMTS), and fourth generation (4G) communication networks or enhanced communication networks based e.g. on LTE or LTE-A, cellular 2nd generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

In the following, some examples of embodiments are described with reference to the drawings, wherein, as an example of a communication network, a cellular wireless communication network, such as an LTE-Advanced based system, is used. However, it is to be noted that the present invention is not limited to an application using such types of communication systems, but is also applicable in other types of communication systems, be it wireless systems, wired systems or systems using a combination thereof.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a communication system where some examples of embodiments are applicable may include an architecture of one or more communication networks including a wired or wireless access network subsystem and a core network. Such an architecture may include one or more communication network control elements, access network elements, radio access network elements, access service network gateways or base transceiver stations, such as a base station (BS), an access point or an eNB, which control a respective coverage area or cell and with which one or more communication elements or terminal devices such as a UE or another device having a similar function, such as a modem chipset, a chip, a module etc., which can also be part of an element, function or application capable of conducting a communication, such as a UE, an element or function usable in a machine to machine communication architecture, or attached as a separate element to such an element, function or application capable of conducting a communication, or the like, are capable to communicate via one or more channels for transmitting several types of data. Furthermore, core network elements such as gateway network elements, policy and charging control network elements, mobility management entities, operation and maintenance elements, and the like may be included.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from an element, function or application capable of conducting a communication, like an UE, and a communication network besides those described in detail herein below.

A communication network may also be able to communicate with other networks, such as a public switched telephone network or the Internet. The communication network may also be able to support the usage of cloud services. It should be appreciated that network elements of the access system, such as BSs and/or eNBs, of a core network etc., and/or respective functionalities may be implemented by using any node, host, server or access node etc. entity suitable for such a usage.

Furthermore, the described network elements, such as terminal devices, communication network control elements of a cell, like a BS or an eNB, access network elements and the like, core network elements etc. as well as corresponding functions as described herein, and other elements, functions or applications capable of conducting a communication may be implemented by software, e.g. by a computer program product for a computer, and/or by hardware. For executing their respective functions, correspondingly used devices, nodes or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a communication network element, network function, or of another entity of the communication network, such as of one or more of radio access network elements like a BS or eNB, may be performed in different entities or functions, such as in a node, host or server, in a flexible manner. In other words, a "division of labour" between involved network elements, functions or entities may vary case by case.

Generally, for properly establishing and handling a communication connection between terminal devices such as a user device or user equipment (UE) and another communication network element or user device, a database, a server, host etc., one or more network elements such as communication network control elements, for example access network elements like access points, base stations, eNBs etc. and core network elements or functions, for example control nodes, support nodes, service nodes, gateways etc. are involved, which may belong to different communication network systems.

Due to increasing traffic load, solutions for increasing the performance of communication networks are desired. One of these solutions is the implementation of carrier aggregation (CA). CA is used, for example, in LTE-Advanced for increasing the bandwidth, and thereby increasing the bitrate. CA can be used for both FDD and TDD.

CA increases communication data throughput by using simultaneous communication link with multiple aggregated components carriers (CC) and allows increasing transmission/reception bandwidth by aggregating cells (i.e. the CCs). When carrier aggregation is used there are a number of serving cells, one for each component carrier. The coverage of the serving cells may differ, for example due to that CCs on different frequency bands will experience different pathloss. The RRC connection is only handled by one cell, the Primary serving cell (or Pcell), served by the Primary component carrier (DL and UL). On the UL primary CC, PUCCH is sent. The other component carriers are all referred to as Secondary component carriers (DL and UL), serving the Secondary serving cells (or Scells). The secondary CCs are added and removed as required, while the primary CC is only changed at handover. The prominent benefits of CA include increased peak data rates, possibility to aggregate fragmented spectrum and fast load balancing.

In order to allow a communication element such as a UE to use the additional cell(s) offered by CA scheme, the Scell(s) first need to be added by RRC and then activated by MAC.

PUCCH, which is transmitted on the primary CC (i.e. communicated in the Pcell), is used to carry various uplink control information. Depending on what kind of information is transmitted by means of the PUCCH, different formats for PUCCH are defined. Examples of such formats are e.g. PUCCH format 3 and PUCCH format 1b with channel selection (also referred to as 1bcs) specified e.g. for 3GPP. These PUCCH formats are used, for example for the purpose of UE feedback for CA.

With regard to FIG. 1, a diagram illustrating examples of a communication network configuration is shown where some examples of embodiments of the invention are applicable. It is to be noted that the structure indicated in FIG. 1 shows only those devices, network elements and links which are useful for understanding principles underlying the examples of embodiments of the invention. As also known by those skilled in the art there may be several other network elements or devices involved in a communication between a communication element (for example a UE) and the network which are omitted here for the sake of simplicity.

In FIG. 1, reference signs 10 and 11 denote a respective communication element such as a UE or the like which is capable of communicating with the communication network, for example via one or more carriers and channels, by using CA.

Reference sign 20 denotes a communication network control element such as a base station or eNB controlling a communication area or cell (indicated by a dotted line) 200. It is to be noted that the eNB 20 may be able to control more than one cell in the communication network, wherein also different carriers can be used by eNB 20 (with partial overlapping coverage areas). In the following, it is assumed that the cell using one carrier controlled by the eNB 20 serves as the Pcell for the (CA based) communications of UEs 10 and 11 (indicated by dashed arrows in FIG. 1).

Furthermore, two additional communication areas or cells 300 and 400 are shown which are controlled by a respective other communication network control element. In the illustrated example, cell 300 is controlled by eNB 30, i.e. it may represent another cell being comparable to cell 200. On the other hand, cell 400 is controlled by an RRH 40, so that cell 400 is e.g. a so-called pico cell being located in the coverage area of a macro cell (e.g. cell 200). It is to be noted that the number of additional cells located in the area or vicinity of cell 200 is not limited to cells 300 and 400.

Furthermore, reference sign 50 denotes an OAM element (including e.g. a $3^{rd}$ party tool for OAM processing), such as an element manager or network manager, which is connected to (at least) eNB 20 directly via a suitable interface 55 (e.g. wired or wireless) or indirectly via another OAM element (not shown) for control purposes.

In the example illustrated in FIG. 1, it is assumed that UEs 10 and 11 conduct a CA based communication wherein the primary CC is provided by eNB 20 (i.e. Pcell 200), while a respective secondary CC is provided by another cell (Scell). That is, cells 300 and 400 are used as Scells for the UEs 10 and 11, respectively. For example, as indicated in FIG. 1 by dashed arrows, UE 10 is connected to the Pcell 200 (i.e. eNB 20) by connection P1 (primary CC) and to the Scell 300 (e.g. eNB 30) by connection S1 (secondary CC). On the other hand, UE 11 is connected to the Pcell 200 (i.e. eNB 20) by connection P2 (primary CC) and to the Scell 400 (e.g. RRH 40) by connection S2 (secondary CC). In this context, it is to be noted that the number of Scells used by one UE is not limited to one Scell; a plurality of Scells may be used by one UE in a CA based communication.

Basically, different deployment scenarios for CA are conceivable.

For example, in a first example, cells using different carriers (referred to for example as carrier F1 and carrier F2), which can be used in CA, may be co-located and overlaid, providing nearly the same coverage (e.g. when cell 200 has two carriers). Here, both layers may provide sufficient coverage and mobility can be supported on both layers, and aggregation is assumed to be possible between overlaid F1 and F2 cells.

In a second example, cells with carriers F1 and F2, respectively, are co-located and overlaid, but F2 has smaller coverage e.g. due to larger path loss. Only F1 provides sufficient coverage and F2 is used to improve throughput. Mobility is performed based on F1 coverage. Again, aggregation is deemed to be possible between overlaid F1 and F2 cells.

In the above described first and second examples, dimensioning of resources used for PUCCH format 1bcs or format 3 can be simplified because the number and the location of the possible Scell candidates is limited. For example, the PUCCH format 1bcs or format 3 resources can be dimensioned for the first and second examples based on the maximum number of UEs with Scell configured/activated per Scell candidate.

However, there are also other scenarios for CA possible. As a third example, it is conceivable that cells with carriers F1 and F2, respectively, cells are co-located, but F2 antennas are directed to the cell boundaries of F1 so that cell edge throughput is increased. F1 provides sufficient coverage but F2 potentially has holes, e.g. due to larger path loss. Mobility is based on F1 coverage. For example, F1 and F2 cells of the same eNB can be aggregated where coverage overlaps.

As a forth scenario, the cell with carrier F1 provides macro coverage and the cells with carrier F2 provided e.g. by RRHs are used to improve throughput (e.g. at hot spots, e.g. corresponding to cells 200 and 400). Mobility is performed based on F1 coverage. In this example, F2 RRHs cells can be aggregated with the underlying F1 (macro) cell.

It is to be noted that also other scenarios than those described above are conceivable for CA communication, and the following description uses one of these scenarios according to the first to fourth examples only for illustrative purposes.

With regard to especially the third and fourth example, it is to be noted that the number of possible Scell candidates per Pcell may be increased. For example, it is possible to support up to 8 or even 12 Scell candidates per Pcell.

In this case, simple PUCCH dimensioning per Scell candidate is not feasible because it would result in unreasonable low uplink throughput and high overhead in the cell with the Pcell role for many Scell candidates.

Therefore, it is useful to employ suitable methods for coordination across Scell candidates competing for the PUCCH resources on the single cell with the Pcell role. As one possible method for PUCCH resource coordination/assignment across the Scells a centralized manager with low latency is employable.

However, even in case of using such a PUCCH resource coordination/assignment method, due to varying traffic/load conditions, it is still possible that the resources are not optimally dimensioned. For example, it is possible that the resources are over-dimensioned, wherein as a result thereof the UL throughput may be reduced (in other words, the UL is not used efficiently). Alternatively, it is also possible that the resources are under-dimensioned, wherein as a result thereof the DL throughput may be reduced (the reason is, that in case no PUCCH format 1bcs or format 3 ACK/NACK resource is available, PDSCH can not be allocated by the PDCCH for the Scell(s) and the UE can not be allocated resources on its Scell(s)).

According to some examples of embodiments of the invention, apparatuses, methods, systems, computer programs, computer program products and computer-readable media usable for monitoring and optimizing the usage of control channels in communication systems are provided. According to examples of embodiments described below, as an example for uplink control channels, PUCCH format 1bcs and PUCCH format 3 for CA and the dimensioning of resources thereof is used for describing principles according the some examples of embodiments.

Conventionally, PUCCH resources (i.e. the number of resources for PUCCH usage) are configured statically. According to some examples of embodiments, it is proposed to implement a method which allows to adapt the amount of PUCCH resources dynamically.

Specifically, according to some examples of embodiments, a monitoring is conducted whether or not an allocation of UL communication resources on a Pcell of a communication network is successful for a communication element like a UE to be scheduled on a DL channel of at least one Scell of the communication network. That is, for example, it is monitored whether a blocking of Scell scheduling due to a lack of PUCCH resources or a PUCCH resource collision due to Scell scheduling occurs. The monitoring result is used for example for incrementing at least one counter.

Corresponding counters can be part of counters used for network evaluation and optimization by OAM. For example, counters usable for a processing according to some examples of embodiments are implemented at a communication network control element like the eNB 20 and reported to the OAM element 50. According to some further examples of embodiments, the counters can be aggregated and/or evaluated by another entity (instead of the eNB, for example), e.g. the OAM element 50.

It is to be noted that according to some examples of embodiments, it is possible to provide a separate performance counter used for monitoring a specific rate of e.g. scheduling blocking (and/or a rate of PUCCH collision) for each possible UL channel type, e.g. for each PUCCH format (here, for example, PUCCH format 3 and per PUCCH format 1bwcs).

As indicated above, by means of a suitable counter, for example, the blocking of Scell scheduling due to a lack of PUCCH resources (and/or a PUCCH resource collision due to Scell scheduling) can be monitored as a single metric of rate. That is, for example, a counter is provided which counts the rate of blocking of a Scell scheduling for the UE due to a lack of UL communication resources on the Pcell. Correspondingly, a counter may be provided which counts the rate of collision of PUCCH resources due to a Scell scheduling for the communication element. According to some further examples of embodiments, a counter may be provided which counts the rate of both blocking of a Scell scheduling for the UE due to a lack of UL communication resources and collision of PUCCH resources due to a Scell scheduling for the communication element on the Pcell.

Whether a counter is used to monitor scheduling blocking or PUCCH collision (or both) may depend, for example, on the fact of whether an eNB or the like is configured to conduct a processing related to scheduling blocking or PUCCH collision (or is set to have a corresponding preference). For example, in case scheduling blocking is implemented, the counter is used to count corresponding scheduling blocking events. Alternatively, a counter for PUCCH collision or a counter for both scheduling blocking and PUCCH collision events may be provided.

According to some further examples of embodiments, instead of using a counter for the rate of scheduling blocking due to lack of PUCCH resources (and/or the rate of PUCCH resource collision due to SCell scheduling), it is possible to implement two or three counters (again optionally per PUCCH format). That is, multiple metrics or counters can be used.

For example, a first counter is implemented which counts a number of attempts for allocating UL communication resources on the Pcell of the communication network for the UE(s) scheduled on the DL channel of the at least one Scell of the communication network. Moreover, a second counter is provide which counts a number of successful allocations of UL communication resources on the Pcell or failed allocations of UL communication resources on the Pcell for the UE(s) scheduled on the DL channel of the at least one Scell.

Specifically, according to some examples of embodiments, the first counter counts the total number of attempts to allocate PUCCH resources because of SCell scheduling. In this context, "attempts to allocate PUCCH resources" means scheduling of an UE on the Scell that would require PUCCH resources (only UEs with allocated Scell DL resources requires PUCCH resources). That is, the eNB can attempt to allocate Scell DL resources for a given UE and as a result PUCCH resources are needed for this UE wherein it is then monitored whether or not PUCCH resources are allocated.

The second counter counts, for example, the number of failed attempts to allocate PUCCH resources due to Scell scheduling blocking due to lack of PUCCH resources (i.e. an eNB internal conflict) and/or due to PUCCH resource collision (i.e. over-the-air conflict). Alternatively or additionally, a counter counting the number of successful attempts to allocate PUCCH resources because of Scell scheduling can be implemented.

That is, according to some examples of embodiments, when multiple metrics/counters are used, for example, the number of events of Scell scheduling blocking due to lack of PUCCH format 3/format 1bwcs resources (and/or the number of events of PUCCH format 3/format 1bwcs collisions) is determined. In other words, the failed (and/or successful) PUCCH allocations due to Scell scheduling are determined. Furthermore, the number of events of Scell scheduling attempts of UEs configured with PUCCH format 3/format 1bwsc is determined. In other words, these are all attempts of PUCCH allocation due to Scell scheduling. Then, the rate value for an unsuccessful resource allocation, e.g. the rate of scheduling blocking (and/or the rate of PUCCH collision), can be derived on the basis of these two counters.

According to some examples of embodiments, an average value, such as an average rate value or average probability value for an unsuccessful resource allocation, is measured or derived. For example, according to some examples of embodiments, a counter is comprised which counts an average rate or probability value for a successful or unsuccessful resource allocation based on values of counters. Alternatively, it is also possible to derive in addition to the average value a standard deviation from samples obtained internally in a predetermined measurement period, for example a TTI when there is an attempt to schedule any UE (e.g. configured with PUCCH format 3/format 1bwcs) in any of the Scells.

It is to be noted that a corresponding measurement period related to the determination of an average value (and a standard deviation) is adjustable. For example, the average rate value (average probability value) is related to averaging a plurality or all of samples (e.g. a rate in each TTI), e.g. it is derived for a predetermined period of time, wherein the predetermined period of time is adjustable between one TTI and a plurality of TTIs. That is, an internal sampling period may be longer than one TTI (for example a couple of TTIs). By means of this, it is possible to ensure a higher reliability of the obtained average rate/probability value. The adjustment of the period of time may depend, for example, on the number of Scell scheduling attempts of UEs (e.g. configured with PUCCH format 3/format 1bwsc). Furthermore, it is to be noted that, according to some examples of embodiments, an averaging/reporting period of a counter may be longer than an internal sampling period, for example 15 minutes, one hour etc. may be sufficient.

The above indicated counter(s) may be implemented as part of a PDSCH/PDCCH scheduling and PUCCH resource management (PUCCH manager, described below).

It is to be noted that the counter(s) of the Pcell may not be updated in a period (e.g. a TTI) when there is no attempt to schedule any UE (e.g. configured with PUCCH format 3/format 1bwcs) in any of the Scells.

Based on the above metric(s), the rate, and/or average rate (probability) value and/or the standard deviation, it is possible to modify a dimensioning of UL resources, such as PUCCH resources. For example, it can be decided and instructed to increase or decrease or keep constant the corresponding amount of PUCCH resources.

For example, the rate or average rate (probability) value is compared with at least one predetermined threshold, and on the basis of the comparison, it is decided whether or not a dimensioning of UL resources is to be modified. As indicated above, such a modification of UL resources comprises one of increasing or decreasing the number or amount of the resources being set for the UL communication resources.

Regarding the at least one threshold used for the comparison, a first threshold may be set which defines a high end threshold related to a requirement for increasing the number of the UL resources. In addition, a second threshold may be set which defines a low end threshold related to an option for decreasing the number of the UL resources.

That is, for example, depending on the operators target rate or average rate (probability) of the Scell scheduling blocking due to lack of PUCCH resources (or the target rate or average rate of PUCCH collision for another implementation example), the amount of PUCCH resources can be adapted semi-statically (by RRC reconfiguration, possibly for some eNB implementations) or statically (by offline reconfiguration).

That is, according to some examples of embodiments, two rate or average rate (probability) thresholds are defined which can be operator configurable. As an example, the probability thresholds concern a value which may be referred to as low_blocking_probability and a value which may be referred to as high_blocking probability (other terms usable for this may be ScellScheduleFailureThresholdHigh and ScellScheduleFailureThresholdLow, respectively). It is to be noted that the terms used above for the thresholds are mere examples; other forms or expressions may be used instead.

For example, assuming a PUCCH format 3 is implemented, in the comparison processing, in case the rate or average rate (probability) value (e.g. the value based on the at least one counter)>high_blocking_probability, then the number of PRBs allocated to PUCCH format 3 is increased (e.g. from 2 to 3 PRBs). On the other hand, in case the rate or average rate (probability) value (e.g. the value based on the at least one counter)<low_blocking_probability, then the number of PRBs allocated to PUCCH format 3 is increased (e.g. from 2 to 1 PRB). In case the low_blocking_probability<=the value of the counter<=high_blocking_probability, then the number of PRBs allocated to PUCCH format 3 is not changed.

It is to be noted that the adaptation of PUCCH resources can be executed by the communication network control element, such as the eNB, or by another element, such as the OAM element, wherein also RRC signaling mechanisms and radio resource management algorithms may be implemented for determining a PUCCH configuration.

With regard to the counter(s) used according to some examples of embodiments, it is possible to implement the required counter(s) per Scell->Pcell pair and/or per Pcell, i.e. all Scells related to one Pcell are considered in one (set of) counter(s). That is, corresponding rate or average rate (probability) values are related to UEs scheduled in one Scell related to the Pcell or to UEs of each Scell related to the Pcell.

Figure 2:
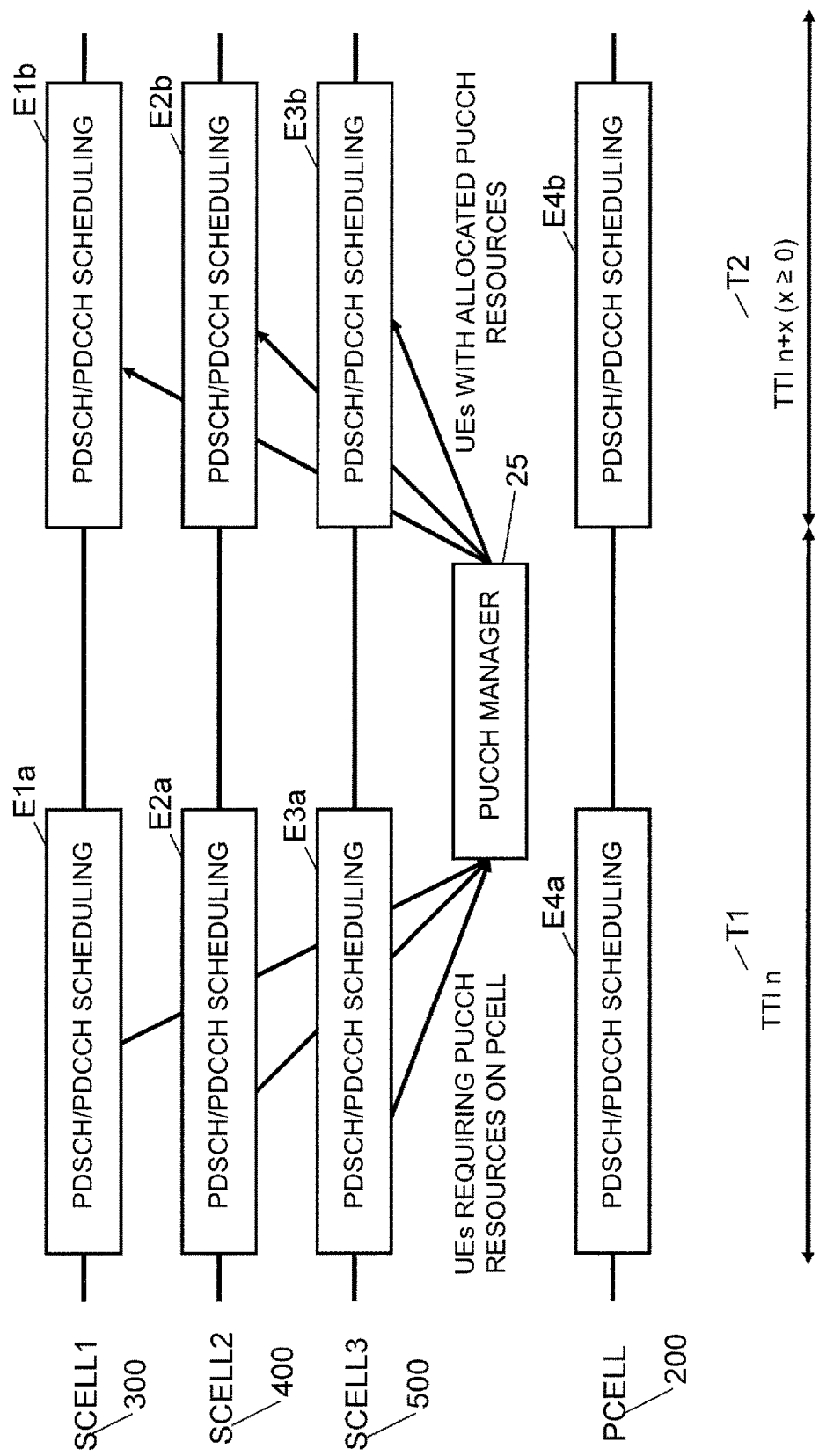
FIG. 2 shows a diagram illustrating a monitoring scheme according to an example of embodiments.

FIG. 2 shows a diagram illustrating a monitoring scheme according to an example of embodiments, where the counter (s) is implemented per one Pcell. Specifically, as indicated above, the counter(s) is included in a PUCCH manager element 25. According to FIG. 2, it is assumed that three Scells 1-3 (i.e. Scells 300 and 400 as indicated in FIG. 1, and a further Scell 500 not shown in FIG. 1) are related to a Pcell (i.e. Pcell 200 as indicated in FIG. 1) (wherein according to some examples of embodiments the number of Scells is not limited to three). That is, according to the example in FIG. 2, the counter(s) is implemented per Pcell and takes into account the UEs in all Scell(s) related to Pcell 200, for example the Scells 300, 400 and 500 which compete for the same PUCCH format 3/format 1bwcs resources on this Pcell.

According to some examples of embodiments, the PUCCH manager 25 (or a corresponding measuring functionality) is part of a communication network control element, such as the eNB 20, of the Pcell, or part of another control entity, such as the OAM element 50. Alternatively, functions thereof are distributed over several elements, such as the eNB 20 and the OAM element 50 (may be also called as a $3^{rd}$ party tool) (for example, functions related to the monitoring/incrementing of counters are located on the eNB side, while other functions, such as counter evaluation and/or resource adaptation functions, are conducted in the OAM element side).

As illustrated in FIG. 2, PDSCH/PDCCH scheduling procedures E1a, E1b, E2a, E2b, E3a, E3b, E4a, E4b are assumed to be conducted in each of the Scells 300, 400, 500 and the Pcell 200 (for illustrative purposes, at least one scheduling event is assumed to happen in a predetermined time period (sampling period of time) T1, T2, wherein the number of events per cell and per sampling period is varying between 0 and a plurality of scheduling events). As indicated in FIG. 2, in a sampling period of time (e.g. period T1 lasting TTI n (n≥1)), when Scells 1-3 (300, 400, 500) conduct a PDSCH/PDCCH scheduling of a respective CA UE, PUCCH resources (for PUCCH format 3/1bcs, for example) are required on the Pcell. The PUCCH manager 25 monitors whether PUCCH allocation was successful for the Scell scheduling; for example, a rate or average rate (probability) of scheduling blocking due to a lack of PUCCH resources per each Scell can be retrieved. By averaging the blocking metrics of the Scells, the PUCCH manager can derive the average rate (probability) of scheduling blocking due to a lack of PUCCH resources per Pcell (i.e. the Pcell for which all Scells 1-3 compete). On the basis of this metric, PUCCH resources in the Pcell can be dimensioned or modified.

In a next period of time (e.g. T1, TTI n+x (where x≥1)), the CA UEs are assigned with PUCCH resources.

That is, according to some examples of embodiments, UL communication resource allocation (e.g. PUCCH resource allocation) in case of CA can be optimized. For this purpose, a measuring functionality, such as a PUCCH manager, in the Pcell eNB collects metrics for determining a rate or a probability of successful/failed attempts to allocate PUCCH resource for an Scell. On the basis thereof, the eNB or an OAM element decides whether to increase or decrease PRBs for PUCCH resource. Thus, for example, PRBs for PUSCH transmission can be saved.

The above described example of embodiments concern a control mechanism for resources being responsible for blocking which are used in the UL for UE ACK/NACK feedback. In particular, PUCCH resources are concerned which can cause either Scell scheduling blocking in DL or PUCCH resource collision/interference in the UL. Next, some examples for implementation of counters according to examples of some embodiments of the invention are given. Specifically, a definition of respective counters is indicated with the following template:

First, a measurement name (clause header) is given which provides an example of a descriptive name of a corresponding measurement type. Then, as a subpoint a), a description is given for providing an explanation of the measurement operation. As a subpoint b), a collection method is indicated which contains the form in which this measurement data is obtained (for example, CC indicates in this regard a cumulative counter, and SI indicates a status inspection). As a subpoint c), a condition is indicated which causes the measurement result data to be updated; this will be defined by identifying protocol related trigger events for starting and stopping measurement processes, or updating the current measurement result value. As a subpoint d), measurement result (measured value(s), units) are indicated. In detail, a description of expected result value(s) (e.g. a single integer value) is given. As a subpoint e), a measurement type is indicated. That is, a short form of the measurement name specified in the header is provided, which is used to identify the measurement type in result files. As a subpoint f), a measurement object class is indicated. For example, a measured object class is indicated. As a subpoint g), a switching technology is indicated, i.e. circuit switched and/or packet switched. As a subpoint h), an indication of a generation is provided. The generation determines if it concerns e.g. EPS or the like (e.g. pure EPS measurement where only EPS events are counted).

It is to be noted that the terms or abbreviations used in the following are only for illustrative purpose and can be replaced by suitable other terms or abbreviations.

IMPLEMENTATION EXAMPLE 1

Attempted PUCCH allocations for SCell scheduling in Carrier Aggregation
   a) This measurement provides the number of attempted PUCCH allocations in the PCell for SCell scheduling in Carrier Aggregation. This measurement is split into subcounters for the PUCCH format 3 and PUCCH format 1bwcs.
   b) CC
   c) On allocation of PUCCH resources in the PCell for SCell scheduling in Carrier Aggregation.
   d) Each measurement is an integer value.
   e) DRB.PucchAllocNbrAtt.PUCCHFormat
      where PUCCHFormat identifies the PUCCH format, which is either "format3" or "format1bwcs".
   f) EUtranCellFDD
     EUtranCellTDD
     EUtranRelation (Optional)
   g) Valid for packet switched traffic
   h) EPS

IMPLEMENTATION EXAMPLE 2

Failed PUCCH allocations for SCell scheduling in Carrier Aggregation
   a) This measurement provides the number of failed PUCCH allocations in the PCell for Carrier Aggregation. This measurement is split into subcounters for the PUCCH format 3 and PUCCH format 1bwcs.
   b) CC
   c) On a Scell scheduling is failed due to lack of PUCCH resources or due to PUCCH collision (over-the-air conflict) in the Pcell for Carrier Aggregation.
   d) Each measurement is an integer value.
   e) DRB.PucchAllocNbrFail.PUCCHFormat
      where PUCCHFormat identifies the PUCCH format, which is either "format3" or "format1bwcs".
   f) EUtranCellFDD
     EUtranCellTDD
     EUtranRelation (Optional)
   g) Valid for packet switched traffic
   h) EPS

IMPLEMENTATION EXAMPLE 3

Probability of SCell scheduling failure due to PUCCH resource shortage
   a) This measurement provides the average Sell scheduling failure rate due to lack of PUCCH resource or PUCCH collision (over-the-air conflict). This measurement is split into subcounters for the PUCCH format 3 and PUCCH format 1bwcs.
b) SI
c) This measurement is obtained by sampling at a predefined interval, the Sell scheduling failure rate due to lack of PUCCH resource or PUCCH collision (over-the-air conflict) and then taking the arithmetic mean.
d) Each measurement is a real value.
e) DRB.PucchAllocFailRateAve.PUCCHFormat
where PUCCHFormat identifies the PUCCH format, which is either "format3" or "format1bwcs".
f) EUtranCellFDD
EUtranCellTDD
EUtranRelation (Optional)
g) Valid for packet switched traffic
h) EPS

IMPLEMENTATION EXAMPLE 4

Standard deviation from the probability of SCell scheduling failure due to PUCCH resource shortage
a) This measurement provides the standard deviation from the average Sell scheduling failure rate due to lack of PUCCH resource or PUCCH collision (over-the-air conflict). This measurement is split into subcounters for the PUCCH format 3 and PUCCH format 1bwcs.
b) SI
c) This measurement is obtained by sampling at a predefined interval, the Sell scheduling failure rate due to lack of PUCCH resource or PUCCH collision (over-the-air conflict), and then making the calculation based on the following formula:

$$\overline{p} = \frac{1}{N}\sum_{i=0}^{N-1} p_i$$

where $\overline{p}$ is the averaged value of the probability, $p_i$ is the probability of scheduling blocking for i-th sample, and N is the total number of samples. Then this measurement (the standard deviation) is calculated by $$\sqrt{\frac{1}{N-1}\sum_{i=0}^{N-1}(p_i - \overline{p})^2}$$

d) Each measurement is a real value.
e) DRB.PucchAllocFailRateAve.PUCCHFormat
where PUCCHFormat identifies the PUCCH format, which is either "format3" or "format1bwcs".
f) EUtranCellFDD
EUtranCellTDD
EUtranRelation (Optional)
g) Valid for packet switched traffic
h) EPS As indicated above, according to some examples of embodiments, thresholds are defined which are used for comparison with the rate values or average rate (probability) values derived from the at least one counter (e.g. probability/rate of the SCell scheduling failure). As an (non-limiting) example, corresponding thresholds can be defined, for example, as attributes in an information object class:
ScellScheduleFailureThresholdHigh (this attribute identifies the high end threshold for the probability/rate of the SCell scheduling failure; the cell may allocate more resources to PUCCH (e.g. from 2 PRBs to 3 PRBs) for CA if the measurement value is higher than this threshold. As legal values, 0 . . . 100 can be set in real value.
ScellScheduleFailureThresholdLow (this attribute identifies the low end threshold for the probability/rate of the SCell scheduling failure; the cell may decrease the resources to PUCCH (e.g. from 2 PRBs to 1 PRB) for CA if the measurement value is lower than this threshold. As legal values, 0 . . . 100 can be set in real value.

Figure 3:
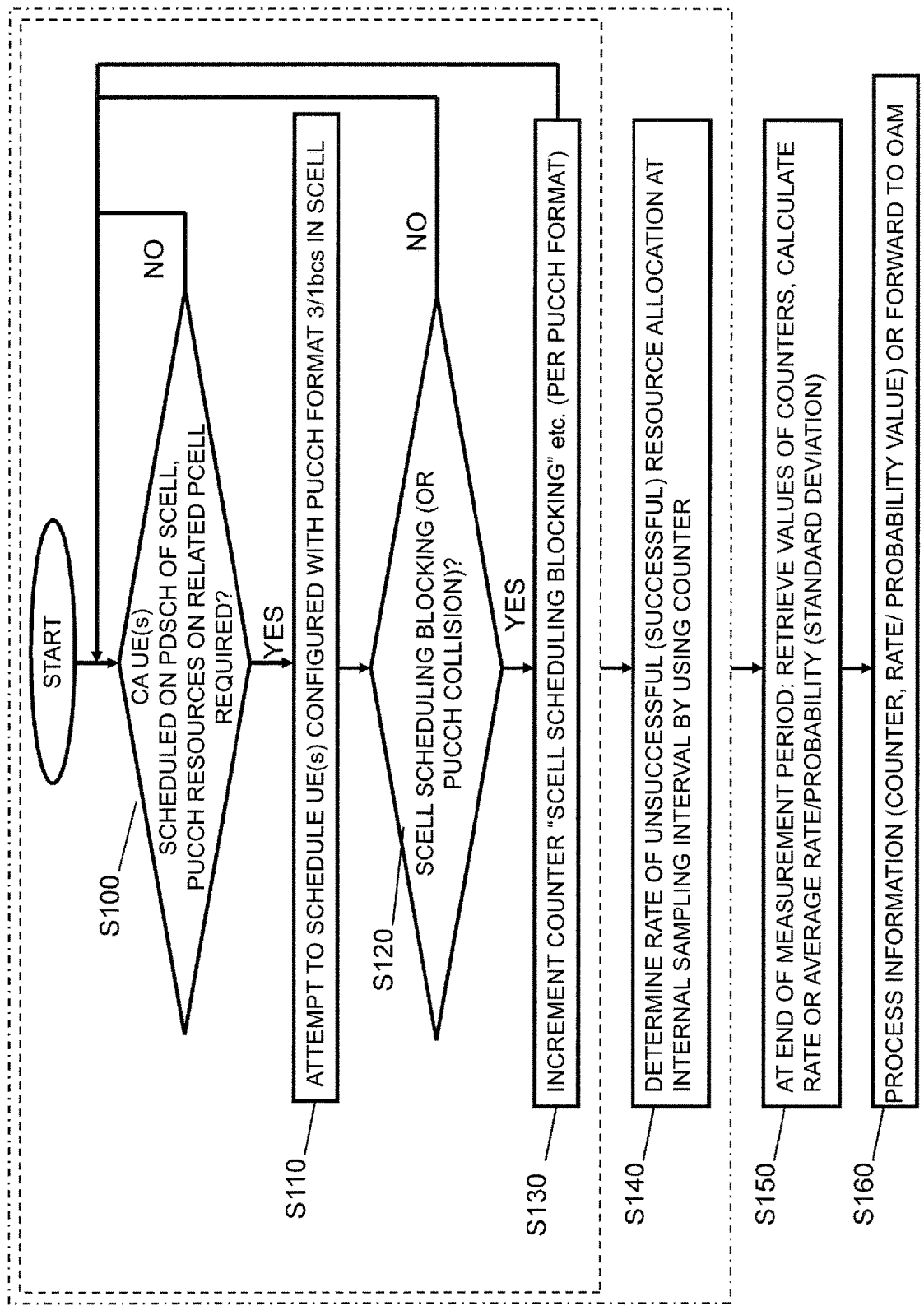
FIG. 3 shows a flow chart of a processing conducted in a communication network control element according to some examples of embodiments.

FIG. 3 shows a flow chart of a processing conducted in a communication network control element, such as eNB 20 (e.g. in a PUCCH manager element or function) according to some examples of embodiments. Specifically, the example according to FIG. 3 is related to the case where a counter (e.g. one counter per PUCCH format) is implemented for determining the rate or average rate (probability) of scheduling blocking due to lack of PUCCH resources (or the rate or average rate (probability) of PUCCH resource collision due to SCell scheduling).

In S100, it is determined whether there are any CA UEs scheduled on DL channels (e.g. PDSCH) of any Scell wherein PUCCH resources on the related Pcell are required. In case the determination is negative (i.e. there is no corresponding scheduling on any Scell), the processing repeats the determination step S100. Otherwise, in case there are corresponding CA UEs scheduled in the Scell, the processing proceeds to S110.

In S110, an attempt is made for scheduling the UEs (determined in S100) configured with PUCCH format 3 (or format 1bcs) in any of the Scells.

Then, in S120, it is checked whether an Scell scheduling blocking due to lack of PUCCH resources (and/or a PUCCH collision) occurred. In case no such event is determined to be occurred, the processing returns to S100. Otherwise, the processing proceeds to S130.

In S130, a counter is incremented which counts the rate of (or events related to) the Scell scheduling blocking (and/or PUCCH collision). A corresponding counter can be provided per each PUCCH format being of relevance (e.g. PUCCH formats 1bcs/3).

It is to be noted that S100, S110 and S120 are related to a monitoring processing according to some examples of embodiments, while S130 is related to an incrementing processing according to some examples of embodiments.

After each internal sampling period interval is elapsed, which may include one TTI or a couple of TTIs, in S140, a rate (or probability) of unsuccessful (or successful) resource allocation is determined by using the counter of S130. The determined value is stored, for example, with an index related to the present internal sampling period interval in a memory. It is to be noted that the processing of S140 is conducted for one Scell or for all Scells.

In S150, after a measurement (or averaging/reporting) period interval is elapsed, which may be longer than the internal sampling period interval, for example, 15 minutes, 1 hour, 12 hours etc., information of the processings in S130 and/or S140 (e.g. counter values, rate/probability values) are retrieved and a rate or an averaged rate (probability) value for unsuccessful (or successful) resource allocation is determined (covering e.g. plural internal sampling period intervals and all Scells per PUCCH format). The determined values are stored, for example, with an index related to the present measurement (or averaging/reporting) period interval in a memory. It is to be noted that the processing of S150 is conducted for all Scells of the Pcell, for example.

In S160, depending on the functionality of the PUCCH manager, the stored information may be processed, e.g. compared with thresholds for deciding as to whether or not a modification of the dimensioning of the PUCCH resources is required, or forwarded to another element, e.g. the OAM element 50, for further processing (in particular the resource modification related processing). In the latter case, for example, the stored information can be transferred, for example as a PM file, to a 3rd party tool (or the OAM element), e.g. via an Itf-N interface from the eNB.

Figure 4:
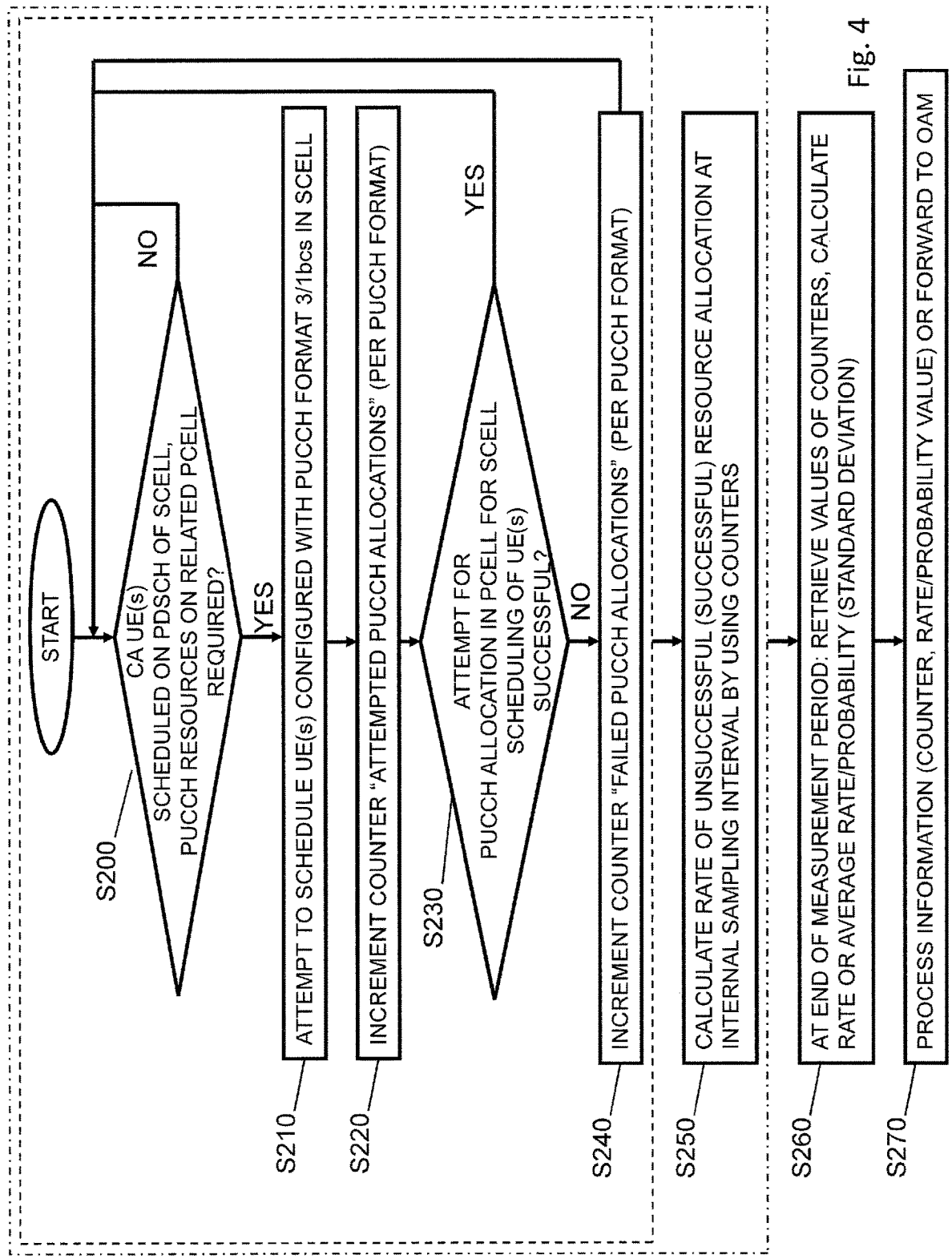
FIG. 4 shows a flow chart of a processing conducted in a communication network control element according to some examples of embodiments.

FIG. 4 shows a flow chart of a processing conducted in a communication network control element, such as eNB 20 (e.g. in a PUCCH manager element or function) according to some examples of embodiments. Specifically, the example according to FIG. 4 is related to the case where two counters (per PUCCH format) and multiple metrics are used. According to this example, a first counter counts a number of attempts for allocating UL communication resources on the Pcell of the communication network for the UE(s) scheduled on the DL channel of the Scell and a second counter counts a number of unsuccessful/failed allocations of UL communication resources on the Pcell for the UE(s) scheduled on the DL channel of the Scell.

In S200, it is determined whether there are any CA UEs scheduled on DL channels (e.g. PDSCH) of any Scell wherein PUCCH resources on the related Pcell are required. In case the determination is negative (i.e. there is no corresponding scheduling on any Scell), the processing repeats the determination step S200. Otherwise, in case there are corresponding CA UEs scheduled in the Scell, the processing proceeds to S210.

In S210, an attempt is made for scheduling the UEs (determined in S200) configured with PUCCH format 3 (or format 1bcs) in any of the Scells.

Then, in S220, a first counter is incremented which counts the attempted PUCCH allocations for Scell scheduling in CA. A corresponding counter can be provided per each PUCCH format being of relevance (e.g. PUCCH formats 1bcs/3).

In S230, it is checked whether the attempt for PUCCH allocation in the Pcell for the Scell scheduling of the UEs was successful or not. In case the PUCCH allocation was successful, the processing returns to S200. Otherwise, the processing proceeds to S240.

In S240, a counter is incremented which counts the events related to the failed PUCCH allocations for Scell scheduling in CA. Again, a corresponding counter can be provided per each PUCCH format being of relevance (e.g. PUCCH formats 1bcs/3).

It is to be noted that S200, S210 and S230 are related to a monitoring processing according to some examples of embodiments, while S220 and S240 are related to an incrementing processing according to some examples of embodiments.

After each internal sampling period interval is elapsed, which may comprise one TTI or a couple of TTIs, in S250, a rate or a probability of unsuccessful (or successful) resource allocation is determined by using the counters of S220 and S240. For example, a difference value is retrieved on the triggered counters and a rate/probability of e.g. Scell scheduling blocking is calculated. The determined value is stored, for example, with an index related to the present internal sampling period interval in a memory. It is to be noted that the processing of S250 is conducted for one Scell or for all Scells.

In S260, after a measurement (or averaging/reporting) period interval is elapsed, which may be longer than the internal sampling period interval, for example, 15 minutes, 1 hour, 12 hours etc., information of the processings in S220 and S240 and/or S250 (e.g. counter values, rate/probability values) are retrieved, and a rate or an average rate (probability) value for unsuccessful resource allocation is determined (covering e.g. plural internal sampling period intervals and all Scells per PUCCH format). The determined values are stored, for example, with an index related to the present measurement (or averaging/reporting) period interval in a memory. It is to be noted that the processing of S260 is conducted for all Scells of the Pcell, for example.

In S270, depending on the functionality of the PUCCH manager, the stored information may be processed, e.g. compared with thresholds for deciding as to whether or not a modification of the dimensioning of the PUCCH resources is required, or forwarded to another element, e.g. the OAM element 50, for further processing (in particular the resource modification related processing). In the latter case, for example, the stored information can be transferred, for example as a PM file, to a 3rd party tool (or to OAM element), e.g. via an Itf-N interface from the eNB.

Figure 5:
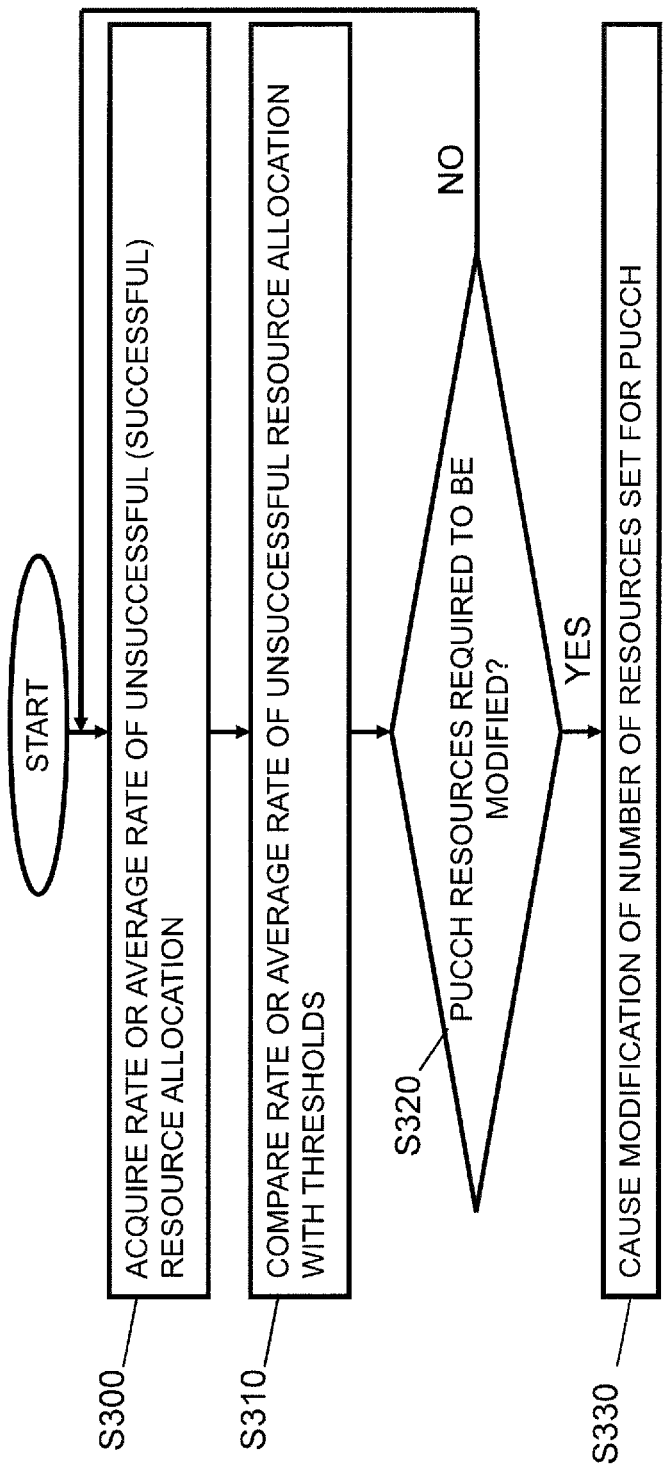
FIG. 5 shows a flow chart of a processing conducted in an OAM element according to some examples of embodiments.

FIG. 5 shows a flow chart of a processing conducted in an OAM element according to some examples of embodiments.

It is to be noted that the functions related to monitoring and optimizing the control channel usage can be implemented, as indicated above, in either of a communication network control element like an eNB and a communication network control element like an OAM element, wherein also a distributed functionality is possible in which parts of the monitoring and optimizing procedure are conducted in a communication network control element like an eNB while other parts thereof are conducted in a communication network control element like an OAM element. For example, the main part of monitoring can be executed on the eNB side while the optimizing procedures like adaptation of resource dimensioning for PUCCH are conducted on the OAM side.

FIG. 5 illustrates an example of embodiments where the latter configuration is implemented.

Specifically, in S300, data related to a rate or an average rate (probability) for an unsuccessful resource allocation are acquired. The rate or average rate (probability) value is based on information related to a monitoring of whether or not an allocation of uplink communication resources on a primary cell of a communication network is successful for a communication element scheduled on a downlink channel of at least one secondary cell of the communication network.

In case the monitoring is conducted e.g. on an eNB side, like in eNB 20, the rate or average rate (probability) value for an unsuccessful resource allocation can be acquired by receiving a corresponding indication from the monitoring eNB (such as indicated in S160 of FIG. 3 or S270 of FIG. 4). On the other hand, in case the calculation of a corresponding probability value is to be conducted in the OAM element, for example, the rate or average rate (probability) value for an unsuccessful resource allocation can be acquired by receiving and processing counter values of at least one counter of the monitoring element and deriving the rate or average rate (probability) value on the basis of the received values of the at least one counter (e.g. in correspondence with S140 or S150 of FIG. 3 or S250 or S260 of FIG. 4).

In S310, the acquired rate or average rate (probability) value is compared with predetermined thresholds, as described above, in order to decide, on the basis of the comparison, whether or not a dimensioning of resources being set for the uplink communication resources is to be modified (S320).

If the decision in S320 is negative, i.e. no modification is required, the processing returns to S300. Otherwise, the processing proceeds to S330.

In S330, the required modification concerning a change of the number of resources being set for e.g. PUCCH is instructed or executed.

It is to be noted that according to a further example of embodiments, the predetermined threshold value to be used for the comparison with the probability value can be adjusted. Specifically, the OAM element is configured to evaluate the results of the comparison between the rate or average rate (probability) value and the current thresholds and decide that the current thresholds are not suitable or should be modified due to another reason (e.g. changed operator preferences). In this case, a change of the thresholds (such as "ScellScheduleFailureThresholdHigh" or "ScellScheduleFailureThresholdLow") is decided to be conducted, and a corresponding instruction may be transmitted to the eNB (e.g. in case a comparison processing is also conducted on the eNB side).

It is to be noted that according to some examples of embodiments, there can be implemented different types of approaches for conducting an optimization of resource allocation. One approach is referred to, for example, as a fully centralized optimization in which the OAM element 50 directly reconfigures the setting in the eNB 20 so as to optimize the relevant parameters for PUCCH resources based on the counters. Another approach is a distributed optimization with centralized control, in which the OAM element 50 defines a threshold for some measurements; once the threshold is exceeded, the eNB 20 has to conduct a processing for optimizing its parameter setting accordingly.

Figure 6:
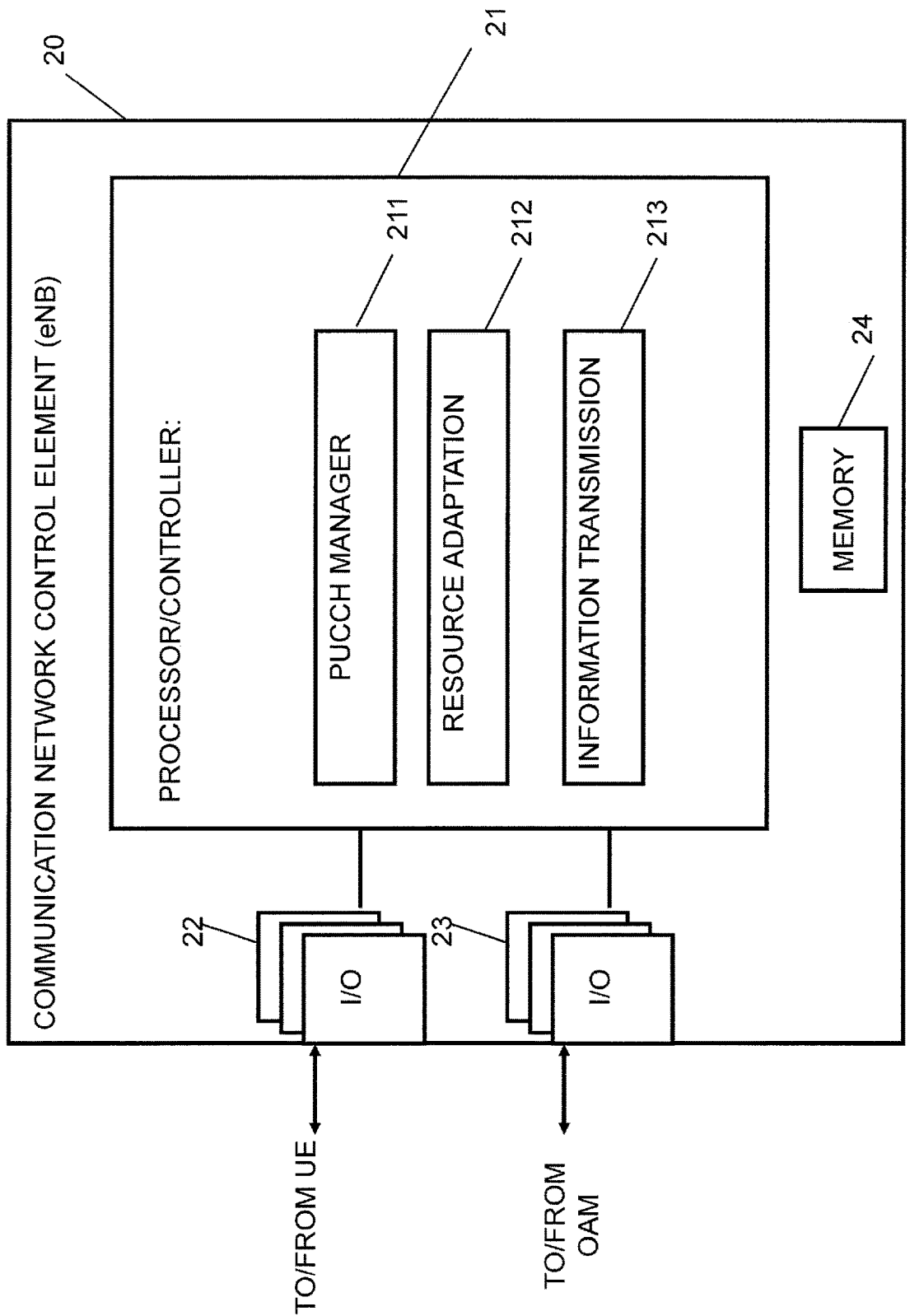
FIG. 6 shows a diagram of a communication network control element according to some examples of embodiments.

FIG. 6 shows a diagram of a communication network control element according to some examples of embodiments, which is configured to implement the monitoring and optimization procedure as described in connection with some of the examples of embodiments. It is to be noted that the communication network control element, like eNB 20, which is shown in FIG. 6, may comprise further elements or functions besides those described herein below. Furthermore, even though reference is made to a communication network control element, the element may be also another device or function having a similar task, such as a chipset, a chip, a module, an application etc., which can also be part of a communication network control element or attached as a separate element to a communication network control element, or the like. It should be understood that each block and any combination thereof may be implemented by various means or their combinations, such as hardware, software, firmware, one or more processors and/or circuitry.

The communication network control element shown in FIG. 6 may comprise a processing circuitry, a processing function, a control unit or a processor 21, such as a CPU or the like, which is suitable for executing instructions given by programs or the like related to the interference cancellation and suppression procedure. The processor 21 may comprise one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 22 and 23 denote transceiver or input/output (I/O) units or functions (interfaces) connected to the processor or processing function 21. The I/O units 22 may be used for communicating with one or more communication elements, such as UE 10 or 11, and the like. The I/O units 23 may be used for communicating with one or more network elements, such as OAM element 50. The I/O units 22 and 23 may be a combined unit comprising communication equipment towards several network elements, or may comprise a distributed structure with a plurality of different interfaces for different network elements. Reference sign 24 denotes a memory usable, for example, for storing data and programs to be executed by the processor or processing function 21 and/or as a working storage of the processor or processing function 21. It is to be noted that the memory 24 may be implemented by using one or more memory portions of the same or different type of memory.

The processor or processing function 21 is configured to execute processing related to the above described monitoring and optimizing procedure. In particular, the processor or processing circuitry or function 21 comprises one or more of the following sub-portions. Sub-portion 211 is a processing portion which is usable as a PUCCH manager. The portion 211 may be configured to perform processing according to FIG. 3 or FIG. 4 (all or part of the steps defined therein). Furthermore, the processor or processing circuitry or function 21 may comprise a sub-portion 212 usable as a portion for conducting a resource adaptation. Furthermore, the processor or processing circuitry or function 21 may comprise a sub-portion 213 usable as a portion for transmitting information, e.g. to OAM element 50.

FIG. 7 shows a diagram of a communication network control element according to some examples of embodiments, which is configured to implement the monitoring and optimization procedure as described in connection with some of the examples of embodiments. It is to be noted that the communication network control element, like OAM 50, which is shown in FIG. 7, may comprise further elements or functions besides those described herein below. Furthermore, even though reference is made to a communication network control element, the element may be also another device or function having a similar task, such as a chipset, a chip, a module, an application etc., which can also be part of a communication network control element or attached as a separate element to a communication network control element, or the like. It should be understood that each block and any combination thereof may be implemented by various means or their combinations, such as hardware, software, firmware, one or more processors and/or circuitry.

The communication network control element shown in FIG. 7 may comprise a processing circuitry, a processing function, a control unit or a processor 51, such as a CPU or the like, which is suitable for executing instructions given by programs or the like related to the interference cancellation and suppression procedure. The processor 51 may comprise one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 52 denotes transceiver or input/output (I/O) units or functions (interfaces) connected to the processor or processing function 51. The I/O units 52 may be used for communicating with one or more communication network control elements, such as eNB 20, and the like. The I/O units 52 may be a combined unit comprising communication equipment towards several network elements, or may comprise a distributed structure with a plurality of different interfaces for different network elements. Reference sign 54 denotes a memory usable, for example, for storing data and programs to be executed by the processor or processing function 51 and/or as a working storage of the processor or processing function 51. It is to be noted that the memory 54 may be implemented by using one or more memory portions of the same or different type of memory.

The processor or processing function 51 is configured to execute processing related to the above described monitoring and optimizing procedure. In particular, the processor or processing circuitry or function 51 comprises one or more of the following sub-portions. Sub-portion 511 is a processing portion which is usable as a PUCCH manager. The portion 511 may be configured to perform processing according to FIG. 3 or FIG. 4 (all or part of the steps defined therein) and steps S310 and S320 of FIG. 5. Furthermore, the processor or processing circuitry or function 51 may comprise a sub-portion 512 usable as a portion for conducting a resource adaptation The portion 512 may be configured to perform processing according to step S330 of FIG. 5. Furthermore, the processor or processing circuitry or function 51 may comprise a sub-portion 514 usable as a portion for modifying or adapting a threshold used e.g. in the eNB (or PUCCH manager) for monitoring.

As indicated above, according to some examples of embodiments, there is defined, as an aspect A1, an apparatus comprising at least one processing circuitry, and at least one memory for storing instructions to be executed by the processing circuitry, wherein the at least one memory and the instructions are configured to, with the at least one processing circuitry, cause the apparatus at least: to monitor whether or not an allocation of uplink communication resources on a primary cell of a communication network is successful for a communication element to be scheduled on a downlink channel of at least one secondary cell of the communication network; and to increment at least one counter according to the monitoring result.

According to an aspect A2, in the apparatus according to aspect A1, the at least one counter comprises a counter configured to count a rate of blocking of a secondary cell scheduling for the communication element due to a lack of uplink communication resources on the primary cell, or a counter configured to count a rate of collision of uplink communication resources due to a secondary cell scheduling for the communication element, or a counter configured to a rate of both of blocking of a secondary cell scheduling for the communication element due to a lack of uplink communication resources on the primary cell and collision of uplink communication resources due to a secondary cell scheduling for the communication element.

According to an aspect A3, in the apparatus according to aspect A1 or A2, the at least one counter comprises a first counter configured to count a number of attempts for allocating uplink communication resources on the primary cell of the communication network for the communication element to be scheduled on the downlink channel of the at least one secondary cell of the communication network, and a second counter configured to count a number of at least one of successful allocations of uplink communication resources on the primary cell and failed allocations of uplink communication resources on the primary cell for the communication element to be scheduled on the downlink channel of the at least one secondary cell.

According to an aspect A4, in the apparatus according to aspect A1 to A3, the at least one memory and the instructions are further configured to, with the at least one processing circuitry, derive a rate value for a successful or unsuccessful resource allocation based on values of the at least one counter.

According to an aspect A5, in the apparatus according to aspect A1 to A4, the at least one counter comprises a counter configured to count an average rate or probability value for a successful or unsuccessful resource allocation based on values of the at least one counter.

According to an aspect A6, in the apparatus according to aspect A5, the average rate or probability value is derived for a predetermined period of time, wherein the predetermined period of time is adjustable between one transmission time interval and a plurality of transmission time intervals.

According to an aspect A7, in the apparatus according to aspect A1 to A6, the at least one memory and the instructions are further configured to, with the at least one processing circuitry, calculate a standard deviation value related to the successful or unsuccessful resource allocation based on values of the at least one counter.

According to an aspect A8, in the apparatus according to aspect A1 to A7, a counter value, or a rate value, or an average rate or probability value is related to communication elements to be scheduled in one secondary cell related to the primary cell or to communication elements of each secondary cell related to the primary cell.

According to an aspect A9, in the apparatus according to aspect A1 to A8, the at least one memory and the instructions are further configured to, with the at least one processing circuitry, compare a counter value, or a rate value, or an average rate or probability value with at least one predetermined threshold, and to decide, on the basis of the comparison, whether or not a dimensioning of resources being set for the uplink communication resources is to be modified.

According to an aspect A10, in the apparatus according to aspect A9, the at least one memory and the instructions are further configured to, with the at least one processing circuitry, cause a modification of resources being set for the uplink communication resources on the basis of the decision, wherein the modification comprises one of increasing or decreasing the number of the resources being set for the uplink communication resources.

According to an aspect A11, in the apparatus according to aspect A9 or A10, the at least one predetermined threshold comprises a first threshold defining a high end threshold related to a requirement for increasing the number of the resources being set for the uplink communication resources, and a second threshold defining a low end threshold related to an option for decreasing the number of the resources being set for the uplink communication resources.

According to an aspect A12, in the apparatus according to aspect A1 to A11, in the monitoring, the allocation of uplink communication resources on the primary cell of the communication network is assumed to be unsuccessful in case of one of a blocking of a secondary cell scheduling for the communication element due to a lack of uplink communication resources on the primary cell, and a collision of uplink communication resources due to a secondary cell scheduling for the communication element.

According to an aspect A13, in the apparatus according to aspect A1 to A12, the at least one counter comprises a separate counter for each channel format for which the uplink communication resources are used.

According to an aspect A14, in the apparatus according to aspect A1 to A13, the at least one memory and the instructions are further configured to, with the at least one processing circuitry, cause transmission of at least one of counter values resulting from incrementing the at least one counter, or rate values or average rate or probability values for a successful or unsuccessful resource allocation to a communication network control element comprising one of a third party tool and an operation and maintenance element.

According to an aspect A15, in the apparatus according to aspect A1 to A14, the at least one memory and the instructions are further configured to, with the at least one processing circuitry, receive information for setting at least one predetermined threshold to be used for a comparison with a counter value, a rate value, an average rate or probability value for a successful or unsuccessful resource allocation.

According to an aspect A16, in the apparatus according to aspect A1 to A15, the communication element is communicating with the communication network by using a carrier aggregation mode with the primary cell and the at least one secondary cell, and the uplink communication resources are related to a physical uplink control channel of format 1b with channel selection or format 3 according to a Long Term Evolution or Long Term Evolution Advanced communication network specification.

According to an aspect A17, in the apparatus according to aspect A1 to A16, the apparatus is implemented in one of a communication network control element of the communication network configured to control the primary cell of the communication network, and/or an operation and maintenance element of the communication network, wherein the communication element is one of a communication terminal, a communication device, and a user equipment.

Furthermore, as indicated above, according to some examples of embodiments, there is defined, as an aspect B1, an apparatus comprising at least one processing circuitry, and at least one memory for storing instructions to be executed by the processing circuitry, wherein the at least one memory and the instructions are configured to, with the at least one processing circuitry, cause the apparatus at least: to acquire a counter value, a rate value or an average rate or probability value for a successful or unsuccessful resource allocation on the basis of information related to a monitoring of whether or not an allocation of uplink communication resources on a primary cell of a communication network is successful for a communication element to be scheduled on a downlink channel of at least one secondary cell of the communication network; to compare the counter value, the rate value or the average rate or probability value with at least one predetermined threshold; and to decide, on the basis of the comparison, whether or not a dimensioning of resources being set for the uplink communication resources is to be modified.

According to an aspect B2, in the apparatus according to aspect B1, the acquiring of the counter value, the rate value or the average rate or probability value for a successful or unsuccessful resource allocation comprises one of receiving the counter value, the rate value or the average rate or probability value from a monitoring element being part of a communication network control element of the communication network, and receiving and processing counter values of at least one counter of the monitoring element and deriving the rate value on the basis of the received values of the at least one counter.

According to an aspect B3, in the apparatus according to aspect B2, the at least one memory and the instructions are further configured to, with the at least one processing circuitry, calculate a standard deviation value related to the successful or unsuccessful resource allocation based on values of the at least one counter.

According to an aspect B4, in the apparatus according to aspect B2 or B3, the at least one counter comprises a counter configured to count a rate of blocking of a secondary cell scheduling for the communication element due to a lack of uplink communication resources on the primary cell, or a counter configured to count a rate of collision of uplink communication resources due to a secondary cell scheduling for the communication element, or a counter configured to count rates of both of blocking of a secondary cell scheduling for the communication element due to a lack of uplink communication resources on the primary cell and collision of uplink communication resources due to a secondary cell scheduling for the communication element.

According to an aspect B5, in the apparatus according to aspect B2 or B3, the at least one counter comprises a first counter configured to count a number of attempts for allocating uplink communication resources on the primary cell of the communication network for the communication element to be scheduled on the downlink channel of the at least one secondary cell of the communication network, and a second counter configured to count a number of at least one of successful allocations of uplink communication resources on the primary cell and failed allocations of uplink communication resources on the primary cell for the communication element to be scheduled on the downlink channel of the at least one secondary cell.

According to an aspect B6, in the apparatus according to aspect B2 to B5, the at least one counter comprises a separate counter for each channel format for which the uplink communication resources are used.

According to an aspect B7, in the apparatus according to aspect B2 to B6, the average rate or probability value is derived for a predetermined period of time, wherein the predetermined period of time is adjustable between one transmission time interval and a plurality of transmission time intervals.

According to an aspect B8, in the apparatus according to aspect B1 to B7, the counter value, the rate value or the average rate or probability value is related to communication elements to be scheduled in one secondary cell related to the primary cell or to communication elements of each secondary cell related to the primary cell.

According to an aspect B9, in the apparatus according to aspect B1 to B8, the at least one memory and the instructions are further configured to, with the at least one processing circuitry, to cause a modification of resources being set for the uplink communication resources on the basis of the decision, wherein the modification comprises one of increasing or decreasing the number of the resources being set for the uplink communication resources.

According to an aspect B10, in the apparatus according to aspect B1 to B9, the at least one predetermined threshold comprises a first threshold defining a high end threshold related to a requirement for increasing the number of the resources being set for the uplink communication resources, and a second threshold defining a low end threshold related to an option for decreasing the number of the resources being set for the uplink communication resources.

According to an aspect B11, in the apparatus according to aspect B1 to B10, the allocation of uplink communication resources on the primary cell of the communication network is assumed to be unsuccessful in case of one of a blocking of a secondary cell scheduling for the communication element due to a lack of uplink communication resources on the primary cell, and a collision of uplink communication resources due to a secondary cell scheduling for the communication element.

According to an aspect B12, in the apparatus according to aspect B1 to B11, the communication element is communicating with the communication network by using a carrier aggregation mode with the primary cell and the at least one secondary cell, and the uplink communication resources are related to a physical uplink control channel of format 1b with channel selection or format 3 according to a Long Term Evolution or Long Term Evolution Advanced communication network specification.

According to an aspect B13, in the apparatus according to aspect B1 to B12, the at least one memory and the instructions are further configured to, with the at least one processing circuitry, to modify the at least one predetermined threshold value to be used for a comparison with the counter value, the rate value or the average rate or probability value, and to cause transmission of the modified at least one predetermined threshold value to a monitoring element being part of a communication network control element of the communication network.

According to an aspect B14, in the apparatus according to aspect B1 to B13, the apparatus is implemented in an operation and maintenance element of the communication network.

It is to be noted that according to some examples of embodiments, the following terms comprising the defined meanings are used:

rate, which is related to failure/attempt or success/attempt of a resource allocation; according to some examples of embodiments, the rate can be a single counter; according to other examples of embodiments, the rate can be derived from other counters (like attempted xxx and unsuccessful xxx). According to examples of embodiments, the rate is represented as an absolute value in the collection period;

average rate, or probability, which is the average rate from several samples/periods;

standard deviation, which is calculated to the average rate.

It should be appreciated that an access technology via which signaling is transferred to and from a network element may be any suitable present or future technology, such as WLAN (Wireless Local Access Network), WiMAX (Worldwide Interoperability for Microwave Access), LTE, LTE-A, Bluetooth, Infrared, and the like may be used; additionally, embodiments may also apply wired technologies, e.g. IP based access technologies like cable networks or fixed lines.

a user device (also called UE, user equipment, user terminal, terminal device, etc.) illustrates one type of an apparatus to which resources on the air interface may be allocated and assigned, and thus any feature described herein with a user equipment may be implemented with a corresponding apparatus, such as a relay node. An example of such a relay node is a layer 3 relay (self-backhauling relay) towards a base station or eNB. The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network, or a nearly exclusive downlink only device, such as a portable video player. Also equipment used for measuring certain values, such as sensors which can measure a temperature, a pressure etc., can be used as a corresponding user device. It should be appreciated that a device may be regarded as an apparatus or as an assembly of more than one apparatus, whether functionally in cooperation with each other or functionally independently of each other but in a same device housing.

embodiments suitable to be implemented as software code or portions of it and being run using a processor or processing function are software code independent and can be specified using any known or future developed programming language, such as a high-level programming language, such as objective-C, C, C++, C#, Java, etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module comprising such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, comprising a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

What is claimed is:
1. A method comprising:
monitoring whether or not an allocation of uplink communication resources on a primary cell of a communication network is successful for a communication element to be scheduled on a downlink channel of at least one secondary cell of the communication network;
incrementing at least one counter according to the monitoring result;

comparing with at least one predetermined threshold one of a counter value, a rate value, or an average rate, or probability value associated with the incremented at least one counter;

deciding, based on the comparison, that a modification of dimensioning of resources being set for the uplink communication resources is required; and based on the deciding, causing the modification of the dimensioning of resources being set for the uplink communication resources, wherein the modification comprises one of increasing or decreasing the number of the resources being set for the uplink communication resources.

2. An apparatus comprising:

at least one processor, and at least one memory storing instructions to be executed by the at least one processor, wherein the at least one memory and the instructions are configured, with the at least one processor, to cause the apparatus to:

monitor whether or not an allocation of uplink communication resources on a primary cell of a communication network is successful for a communication element to be scheduled on a downlink channel of at least one secondary cell of the communication network;

increment at least one counter according to the monitoring result;

compare with at least one predetermined threshold one of a counter value, a rate value, or an average rate, or probability value associated with the incremented at least one counter;

based on the comparison, decide that a modification of dimensioning of resources being set for the uplink communication resources is required; and based on the deciding, perform the modification of the dimensioning of resources being set for the uplink communication resources, wherein the modification comprises one of increasing or decreasing the number of the resources being set for the uplink communication resources.

3. The apparatus according to claim 2, wherein the at least one counter comprises:

a counter configured to count a rate of blocking of a secondary cell scheduling for the communication element due to a lack of uplink communication resources on the primary cell, or a counter configured to count a rate of collision of uplink communication resources due to a secondary cell scheduling for the communication element, or a counter configured to a rate of both of blocking of a secondary cell scheduling for the communication element due to a lack of uplink communication resources on the primary cell and collision of uplink communication resources due to a secondary cell scheduling for the communication element.

4. The apparatus according to claim 2, wherein the at least one counter comprises:

a first counter configured to count a number of attempts for allocating uplink communication resources on the primary cell of the communication network for the communication element to be scheduled on the downlink channel of the at least one secondary cell of the communication network, and a second counter configured to count a number of at least one of successful allocations of uplink communication resources on the primary cell and failed allocations of uplink communication resources on the primary cell for the communication element to be scheduled on the downlink channel of the at least one secondary cell.

5. The apparatus according to claim 4, wherein the second counter counts a number of failed attempts to allocate physical uplink control channel resources due to Scell scheduling blocking due to at least one of a lack of physical uplink control channel resources, a conflict, or due to physical uplink control channel resource over-the-air collision or conflict.

6. The apparatus according to claim 4, wherein the second counter is counting a number of successful resource allocations to allocate physical uplink control channel resources because of Scell scheduling being implemented.

7. The apparatus according to claim 2, wherein the at least one memory and the instructions are further configured, with the at least one processor, to cause the apparatus to:

derive a rate value for a successful or unsuccessful resource allocation based on values of the at least one counter.

8. The apparatus according to claim 2, wherein the at least one counter comprises:

a counter configured to count an average rate or probability value for a successful or unsuccessful resource allocation based on values of the at least one counter.

9. The apparatus according to claim 8, wherein the average rate or probability value is derived for a predetermined period of time, wherein the predetermined period of time is adjustable between one transmission time interval and a plurality of transmission time intervals.

10. The apparatus according to claim 2, wherein the at least one memory and the instructions are further configured, with the at least one processor, to cause the apparatus to:

calculate a standard deviation value related to the successful or unsuccessful resource allocation based on values of the at least one counter.

11. The apparatus according to claim 2, wherein the one of a counter value, or a rate value, or an average rate or probability value is related to communication elements to be scheduled in one secondary cell related to the primary cell or to communication elements of each secondary cell related to the primary cell.

12. The apparatus according to claim 2, wherein the at least one predetermined threshold comprises a first threshold defining a high end threshold related to a requirement for increasing the number of the resources being set for the uplink communication resources, and a second threshold defining a low end threshold related to an option for decreasing the number of the resources being set for the uplink communication resources.

13. The apparatus according to claim 2, wherein in the monitoring, the allocation of uplink communication resources on the primary cell of the communication network is assumed to be unsuccessful in case of one of a blocking of a secondary cell scheduling for the communication element due to a lack of uplink communication resources on the primary cell, and a collision of uplink communication resources due to a secondary cell scheduling for the communication element.

14. The apparatus according to claim 2, wherein the at least one counter comprises a separate counter for each channel format for which the uplink communication resources are used.

15. The apparatus according to claim 2, wherein the at least one memory and the instructions are further configured, with the at least one processor, to cause the apparatus to:

cause transmission of at least one of the counter value resulting from incrementing the at least one of the counter, or rate value or average rate or probability values for a successful or unsuccessful resource allocation to a communication network control element comprising one of a third party tool and an operation and maintenance element.

16. The apparatus according to claim 2, wherein the at least one memory and the instructions are further configured, with the at least one processor, to cause the apparatus to:

receive information for setting at least one predetermined threshold to be used for a comparison with the counter value, the rate value, the average rate or the probability value for a successful or unsuccessful resource allocation.

17. The apparatus according to claim 2, wherein the communication element is configured to communicate with the communication network by using a carrier aggregation mode with the primary cell and the at least one secondary cell, and the uplink communication resources are related to a physical uplink control channel of format 1 b with channel selection or format 3 according to a Long Term Evolution or Long Term Evolution Advanced communication network specification.

18. The apparatus according to claim 2, embodied in one of a communication network control element of the communication network configured to control the primary cell of the communication network, and an operation and maintenance element of the communication network, wherein the communication element is one of a communication terminal, a communication device, and a user equipment.

19. An apparatus comprising
at least one processor, and
at least one memory storing instructions to be executed by the at least one processor, wherein the at least one memory and the instructions are configured, with the at least one at least one processor, to cause the apparatus at least to:

acquire a counter value, a rate value or an average rate or probability value for a successful or unsuccessful resource allocation based on information related to a monitoring of whether or not an allocation of uplink communication resources on a primary cell of a communication network is successful for a communication element to be scheduled on a downlink channel of at least one secondary cell of the communication network;

compare one of the counter value, the rate value or the average rate or probability value with at least one predetermined threshold; and decide, based on the comparison, that a modification of dimensioning of resources being set for the uplink communication resources is required; and based on the deciding, determining the modification of the dimensioning of resources being set for the uplink communication resources, wherein the modification comprises one of increasing or decreasing the number of the resources being set for the uplink communication resources.

\* \* \* \* \*